Sept. 8, 1953                    H. A. WESTBERG                    2,651,285
                                GRAIN TREATMENT MEANS
Filed Nov. 8, 1951                                                 2 Sheets-Sheet 1
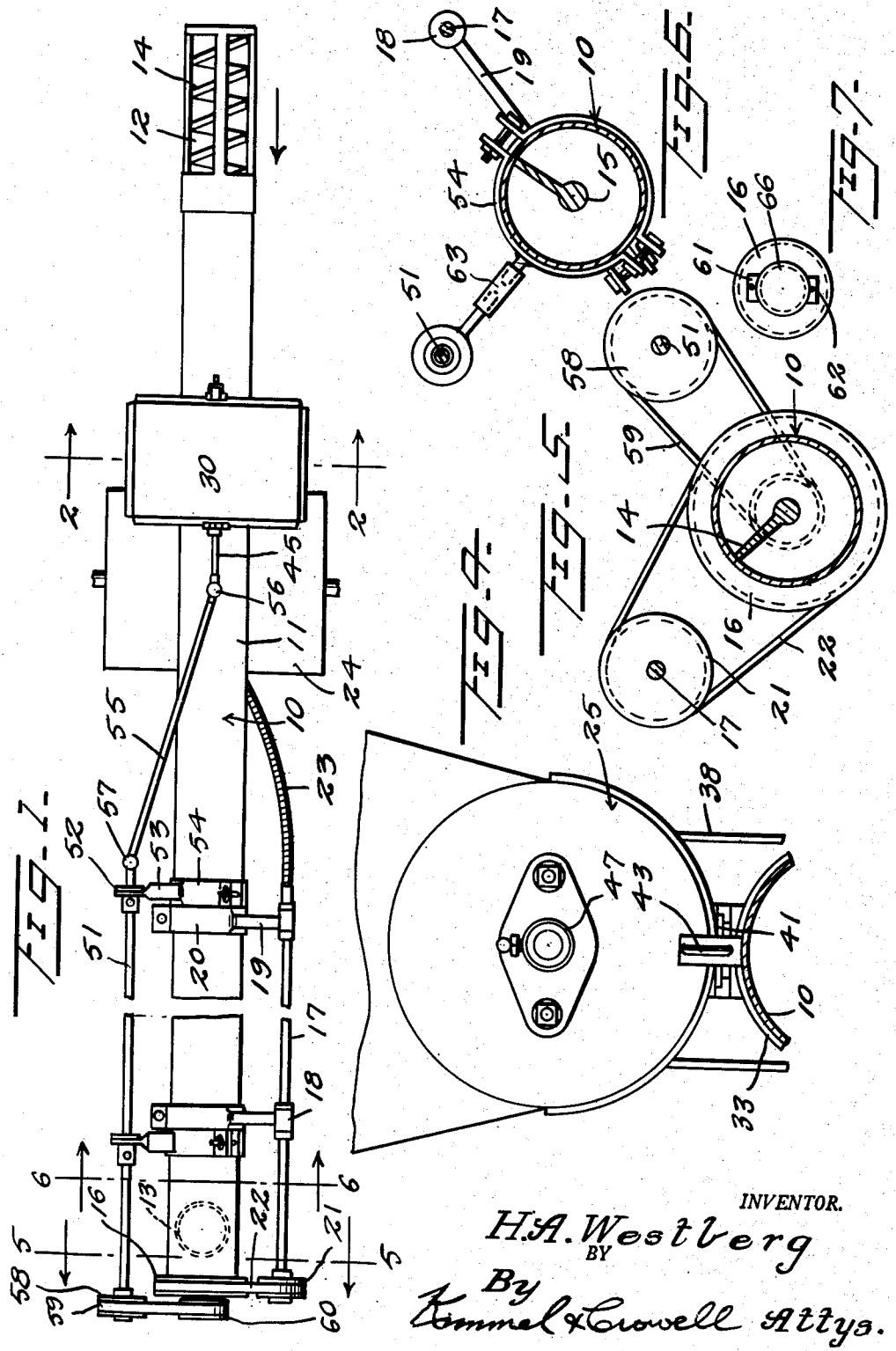
INVENTOR.
H. A. Westberg
BY
Kimmel & Crowell Attys.

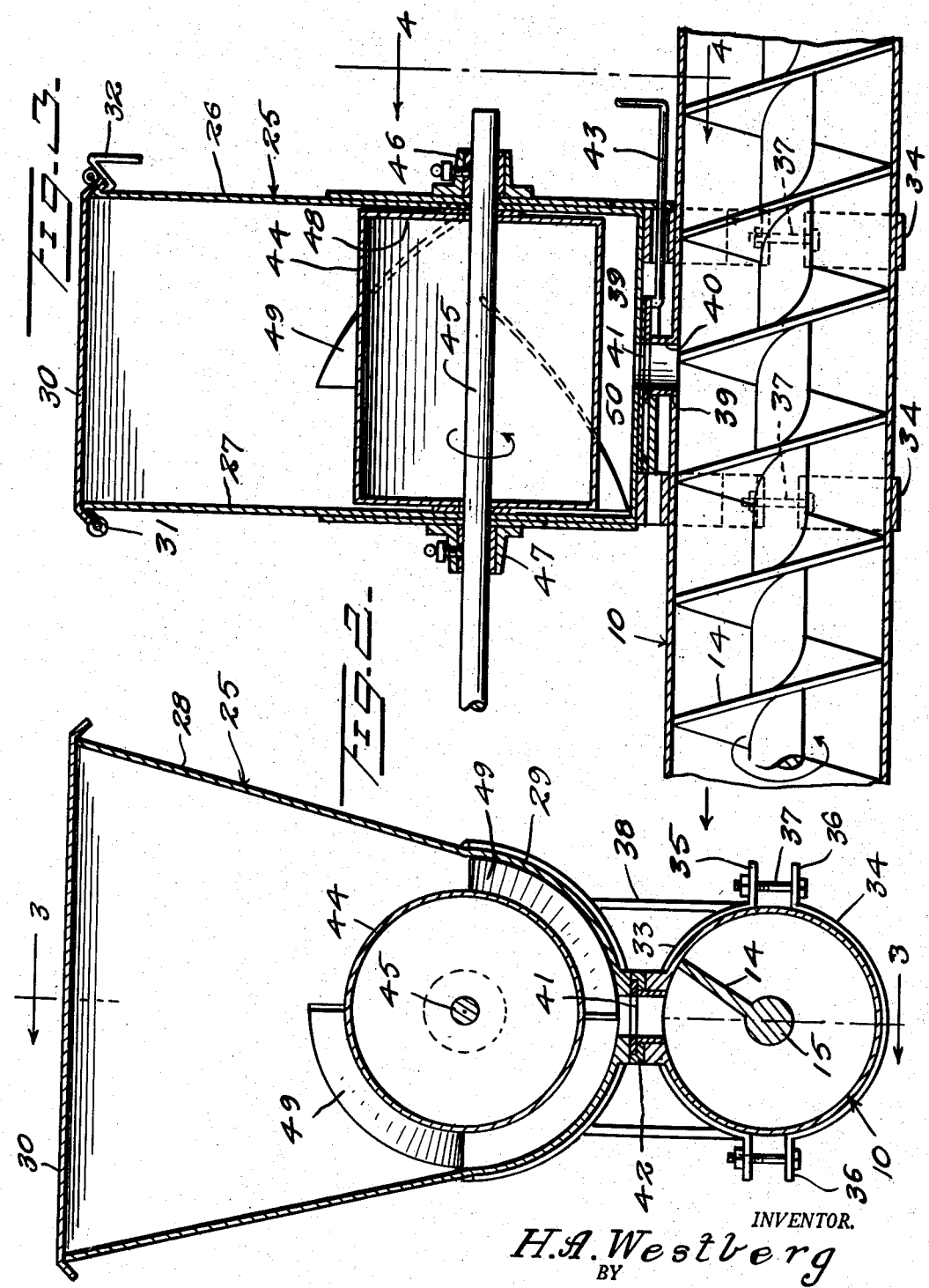

Patented Sept. 8, 1953

2,651,285

UNITED STATES PATENT OFFICE 2,651,285

GRAIN TREATMENT MEANS

Harold A. Westberg, Salina, Kans., assignor to The Wyatt Manufacturing Co., Inc., Salina, Kans.

Application November 8, 1951, Serial No. 255,433

1 Claim. (Cl. 118—19)

This invention relates to a grain treating means for use with a grain conveyor or loader.

In the transfer of grain from a truck or hopper body to a storage bin, or from a lower receptacle or container to an elevated receiver a portable conveyer of the screw type is used, and where the grain is to be placed in storage, it is advisable to treat the grain with an insecticide so as to kill the insects which attack the grain. When this grain is to be used for seed, it is also advisable to inoculate the seed with certain bacteria to promote quicker germination, and it is also advisable to treat the seed with a fungicide or dry powdered chemical to prevent development of plant diseases or fungi. While various treating devices have been devised which will effectively treat the grain, these devices require a separate handling of the grain. It is, therefore, an object of this invention to provide in combination a screw conveyer or transfer device and a grain treatment means whereby the grain may be treated at the same time that the grain is being conveyed so that it will not be necessary to separately handle the grain in order to treat the grain.

Another object of this invention is to provide a grain treatment device which can be produced as an attachment for a screw conveyor so that the conveyer may be converted at any time into a combined conveyer and grain treatment means.

A further object of this invention is to provide a grain treatment means wherein the discharge of treating material into the conveyer may be readily controlled or regulated according to the speed of the conveyer.

A further object of this invention is to provide in a treating material hopper an improved feeding means for feeding the treating material and preventing bridging of the treating material and permitting uniform rate of application.

In the drawings:

Figure 1 is a plan view of a combined elevator and grain treating means constructed according to an embodiment of this invention.

Figure 2 is a sectional view taken on the line 2—2 of Figure 1.

Figure 3 is a fragmentary sectional view taken on the line 3—3 of Figure 2.

Figure 4 is a fragmentary sectional view taken on the line 4—4 of Figure 3.

Figure 5 is a sectional view taken on the line 5—5 of Figure 1.

Figure 6 is a sectional view taken on the line 6—6 of Figure 1.

Figure 7 is an end elevation of the connection between the conveyer driving and treating mechanism.

Referring to the drawings, the numeral 10 designates generally an elevator or conveyer which embodies an elongated tubular housing 11 which is formed at one end with an intake port 12 and is provided adjacent the opposite end with a laterally extended outlet nipple 13. A screw conveyer 14 is rotatably disposed in the housing 10, and the forward end 15 of the conveyer shaft has mounted thereon a grooved pulley 16.

Conveyor drive shaft 17 is rotatably disposed in bearings 18, which are secured to laterally projecting struts 19 carried by clamping bands 20. The forward end of drive shaft 17 has a grooved pulley 21 secured thereon, about which belt 22 is trained. Belt 22 is also trained about driven pulley 16. The inner or rear end of shaft 17 has coupled thereto a flexible drive shaft 23 which is operated from a power member 24. It will be understood that the drive means for the conveyer is herein shown as one form of such drive means, and that the conveyer may be driven by any suitable drive means.

In order to provide a means whereby the grain which is moving forwardly within the housing 10 upon rotation of the conveyer 14 may be treated or coated with treating material, I have provided a hopper 25 which is mounted on the housing 10 adjacent the rear of the housing and slightly forwardly of the intake 12. The hopper 25 is formed of parallel rear and front walls 26 and 27 respectively, and is also formed with downwardly convergent side walls 28. The side walls 28 merge into an arcuate bottom wall 29. A closure 30 is pivotally secured, as at 31, to the upper end of hopper 25 and is latched in closed position by means of a pivoted latching member 32. The hopper 25 is secured to the housing 10 by means of confronting clamping bands 33 and 34. The bands 33 and 34 are substantially semi-circular, and each band is formed with outwardly extending ears 35 and 36 respectively, which are connected together by means of bolts 37. Clamping band 33 is fixed relative to the hopper bottom 29 by means of bracing bars 38, which are fixed between the hopper bottom 29 and outer end portions of band 33.

The housing 10 is formed with an opening 39 in the upper side thereof, and a nipple or grain guiding member 40 is fixed to the bottom wall 29 and projects into the opening 39. A manually operable slide valve 41 is carried by a guide means 42, which is fixed to the bottom wall 29 about the nipple 40 and valve 41 has an L-shaped operating handle projecting rearwardly therefrom, whereby valve member 41 may be manually adjusted to the desired open or closed position. The material which is to be combined with the grain within the housing 10, forming a coating in the grain, is of such character that this material requires an agitating or feeding means in view of the bridging characteristic of this material in the hopper. In order, therefore, to provide for even flow of the material from hopper 25 to the housing 10, I have provided a substantially cylindrical member 44 which is fixed to a shaft 45 journalled bearings 46 and 47 carried by the end walls 26 and 27 respectively. The cylindrical member 44 is formed with end heads 48 and the peripheral surface of cylindrical member 44 has fixed thereto two or more spirally disposed agitator blades 49. As shown in Figure 3, these blades 49 do not extend the full length of the cylindrical member 44 so that the material will not be moved from one end of the hopper to the other, but will be moved endwise sufficiently to normally overlie the outlet opening 50 which is formed in the bottom wall 29.

Agitator drive shaft 51 is rotatably carried by bearings 52 which are carried by laterally projecting struts 53. The struts 53 are fixed to clamping bands 54, which engage about housing 10. Shaft 45 is coupled to shaft 51 by means of an obliquely disposed shaft 55 and shaft 55 is connected at one end to shaft 45 by means of a universal joint 56, and is connected at the other end to shaft 51 by means of a second universal joint 57.

The forward end of shaft 51 has fixed thereon a grooved pulley 58 about which belt 59 engages and a grooved pulley 60 is fixed to pulley 16 by means of a plate 61 secured to the forward face of pulley 16 by means of fastening devices 62. Belt 59 engages about pulley 60 so that when conveyer shaft 15 is rotating, agitator or shaft 51 will also rotate.

As shown in Figure 6, the forward one of the struts supporting shaft 51 is formed with adjustable means 63 whereby belt 59 may be maintained taut.

In the use and operation of this device, the intake end of housing 10 is extended into a quantity of grain which is preferably on a lower level so that upon operation of power member 24, conveyer screw will be rotated to move the grain from the receiver to a collector. The desired treating material which is to be used for coating or treating the grain is discharged into hopper 25 so that with rotation of conveyer drive shaft 17, feeding member 44—49 will be rotated to feed the treating material into housing 10 for mixture with and coating upon the grain which is moving forwardly between the convolutions of the conveyer 14.

What is claimed is:

In combination, a grain loader comprising a tubular housing having a discharge opening at one end and an intake at the other end, a screw conveyor rotatable in said housing, a treatment material hopper, securing means for mounting said hopper on said housing adjacent said intake, a connection between said hopper and said housing whereby the material in said hopper will be discharged into said housing, an agitator rotatable on a horizontal axis aligned with the axis of said conveyor comprising a cylinder having spirally disposed blades thereon in said hopper, common drive means for simultaneously rotating said conveyor and said agitator, and an operative connection between said agitator and said conveyor rotating means, valve means in said connection for regulating the discharge of material to said housing, and means exterior of said housing for regulating said valve.

HAROLD A. WESTBERG.

References Cited in the file of this patent

UNITED STATES PATENTS

| Number | Name | Date |
|---|---|---|
| 1,573,340 | Weitman | Feb. 16, 1926 |
| 1,739,642 | Light | Dec. 17, 1929 |